METHOD AND APPARATUS FOR WARP KNITTING

Filed Oct. 24, 1960 10 Sheets-Sheet 1

INVENTOR
Rex S. MacCaffray, Jr.
BY
[signature]
ATTORNEYS.

Dec. 19, 1961 R. S. MacCAFFRAY, JR 3,013,419

METHOD AND APPARATUS FOR WARP KNITTING

Filed Oct. 24, 1960 10 Sheets-Sheet 2

INVENTOR
Rex S. MacCaffray, Jr.
BY
[signature]
ATTORNEYS

INVENTOR

Rex S. MacCaffray, Jr.

BY

[signature]

ATTORNEYS

METHOD AND APPARATUS FOR WARP KNITTING

Filed Oct. 24, 1960

INVENTOR
Rex S. MacCaffray, Jr.
BY
ATTORNEYS

INVENTOR
Rex S. MacCaffray, Jr.
BY
ATTORNEYS

INVENTOR
Rex S. MacCaffray, Jr.
BY
[signature]
ATTORNEYS

INVENTOR
Rex S. MacCaffray, Jr.
BY
[signature]
ATTORNEYS.

Dec. 19, 1961 R. S. MacCAFFRAY, JR 3,013,419

METHOD AND APPARATUS FOR WARP KNITTING

Filed Oct. 24, 1960 10 Sheets-Sheet 8

INVENTOR
Rex S. MacCaffray, Jr.
BY
[signature]
ATTORNEYS.

INVENTOR
Rex S. MacCaffray, Jr.
BY
[signature]
ATTORNEYS

METHOD AND APPARATUS FOR WARP KNITTING

Filed Oct. 24, 1960

10 Sheets-Sheet 10

INVENTOR
Rex S. MacCaffray, Jr.
BY
[signature]
ATTORNEYS 3,013,419
METHOD AND APPARATUS FOR WARP KNITTING Rex S. MacCaffray, Jr., Boiling Springs, Pa., assignor to C. H. Masland & Sons, Carlisle, Pa., a corporation of Pennsylvania Filed Oct. 24, 1960, Ser. No. 64,451
13 Claims. (Cl. 66—85)

The present invention relates to a method and apparatus for warp knitting pile fabrics such as carpets and rugs, having uncut loop pile in an otherwise all cut pile fabric or vice versa.

A purpose of the invention is to provide cut and loop pile in a warp knitted pile fabric in the same wale and in the same course.

A further purpose is to selectively shield certain cutting plush points in the gang of plush points in each course and thus prevent the loop from encountetring the cutting plush point at the position where the shield is operating, allowing the shielded plush points to cast off the loops when the plush points retract, and thus forming loop pile.

A further purpose is to avoid changing the shogging motions of the guide bars of a warp knitting machine in order to change the design of cut and loop pile fabric, such as carpet.

A further purpose is to permit formation selectively as the selector mechanism may require of cut and loop pile, all cut pile, or all loop pile, as desired, by shielding certain of the cutting plush points according to the selection, without need to change the threading and without need to change the shogging of the guide bars.

A further purpose is to shorten the time of changeover from one fabric pattern to another in warp knitting.

A further purpose is to increase the flexibility in the design of cut and loop pile face warp knitted pile fabrics.

A further purpose is to avoid the necessity to change the sets of plush points in changing the design of cut and loop pile in warp knitted pile fabrics.

Further purposes appear in the specification and in the claims.

In the drawings I have chosen to illustrate a few only of the numerous embodiments in which the invention may appear, selecting the forms shown from the standpoints of convenience in illustration, satisfactory operation and clear demonstration of the principles involved.

FIGURE 1 is a diagrammatic vertical section through a Raschel warp knitting machine of the invention, the parts being located at a position corresponding to 40° in the cycle, according to MacCaffray U.S. Patent No. 2,949,755, granted August 23, 1960, for Warp Knitting Machine.

FIGURE 1*a* is a diagrammatic expanded plan view showing the knitting parts and yarn in a position corresponding to FIGURE 1.

FIGURE 2 is a diagrammatic vertical section of the Raschel warp knitting machine of the invention, showing the knitting parts at a position corresponding to 110° in the cycle.

FIGURE 2*a* is an enlarged fragmentary expanded diagrammatic plan view showing the knitting parts in the position corresponding to FIGURE 2.

FIGURE 3 is a fragmentary diagrammatic vertical section showing the knitting parts in the position corresponding to 210° in the cycle.

FIGURE 3*a* is an enlarged fragmentary expanded plan view showing the knitting parts in the position corresponding to 210° in the cycle.

FIGURE 4 is a diagrammatic vertical section showing the knitting parts in the position corresponding to 270° in the cycle.

FIGURE 4*a* is an enlarged fragmentary expanded plan view showing the knitting parts in the position corresponding to FIGURE 4.

FIGURE 5 is a diagrammatic vertical section showing the knitting parts in the position corresponding to 300° in the cycle.

FIGURE 5*a* is an enlarged fragmentary expanded plan view showing the knitting parts in the position of FIGURE 5.

FIGURE 6 is a diagrammatic vertical section showing the knitting parts in the position corresponding to 330° in the cycle.

FIGURE 6*a* is an enlarged fragmentary expanded plan view showing the knitting parts corresponding to the position of FIGURE 6.

FIGURE 7 is a diagrammatic vertical section showing the knitting parts in position corresponding to 360° of the cycle or 0° in the next cycle.

FIGURE 7*a* is an enlarged fragmentary expanded plan view showing the knitting parts in the position corresponding to FIGURE 7.

Figure 12A:
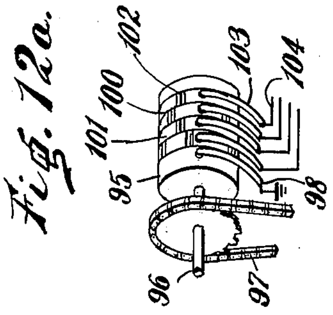
FIGURE 12 is a detailed side elevation of the round loop shielding element of FIGURE 11.

FIGURE 12*a* is a diagrammatic perspective of a pattern drum which may be used with the device of the invention.

Describing in illustration but not in limitation and referring to the drawings:

In the prior art, a number of different mechanisms have been developed for producing warp knitted cut and looped face pile fabrics. Two examples are Newman U.S. Patent No. 2,931,197 and Herrnstadt U.S. Patent No. 2,718,132. Newman provides selective weftwise positioning for cut and loop pile in each course but has no provision for holding the cut pile loops to insure even height in cut pile areas, since he must cast off on each cycle. It is also not possible in Newman to produce all loop pile or all cut pile without changing the equipment.

Herrnstadt provides no selective feature whatever.

In my copending applications Serial No. 733,372, filed May 6, 1958, for Warp Knitting Process, Machine and Fabric, now Patent No. 2,976,705, and Serial No. 840,356, filed September 16, 1959, for Warp Knitting Machine, now Patent No. 2,959,947, I illustrate a selection of cut and looped pile in a warp knitting pile fabric by controlling the shogging of the guide bars to determine whether cut or loop pile will be produced. In order to change the distribution of cut and loop pile it is necessary to change the shogging of the guide bars.

By the present invention cut and loop pile can be produced without the necessity to change the threading of the pile guide bar or change the shogging of any guide bars. In the preferred embodiment of the present invention, it is possible without any change in the mechanism other than the pattern control to produce all cut pile face, all loop pile face or any combination or distribution of cut and loop pile face. The machine is set up and operated just as if it were to produce all cut pile, and it has cutting plush points at each needle space, and the only change required is the provision of shields or auxiliary plush points, and a control therefor. Thus, when the shield is operating at a particular needle space, uncut or loop pile is produced, and when the shield is retracted to expose the cutting point at a particular needle space, cut pile is produced in the usual manner.

In one embodiment of the invention the shields are provided on an auxiliary plush point bar, which has its own shogging mechanism, and the lateral position of the auxiliary plush point bar determines where loop pile will be produced, all other pile being cut.

It will be evident that in accordance with the invention the control of the selection of loop and cut pile can therefore be made either mechanically or electrically as desired, and in any case the control of cut and loop pile is independent of the normal shogging and other positioning mechanism of the guide bars of the warp knitting machine.

One great advantage of the present invention is that it is possible to make changes from one cut and loop pattern to another cut and loop pattern or to a cut pattern or to an uncut pattern, from or to any one of these, even more quickly than patterns can be changed on a jacquard loom. These changes no longer require the services of a mechanic, but can be made by simple adjustments within the capability of the usual knitting machine operator.

Considering now the drawings in detail, FIGURES 1 to 7, 1*a* to 7*a*, and 8 show a usual Raschel type warp knitting machine, which may for the purpose of general understanding be of the character disclosed in my U.S. Patents Nos. 2,891,396, 2,907,193 and 2,907,191, except as modified according to the present invention, and except for the cam sequence of my U.S. Patent No. 2,949,755 the use of which is optional.

Figure 1:
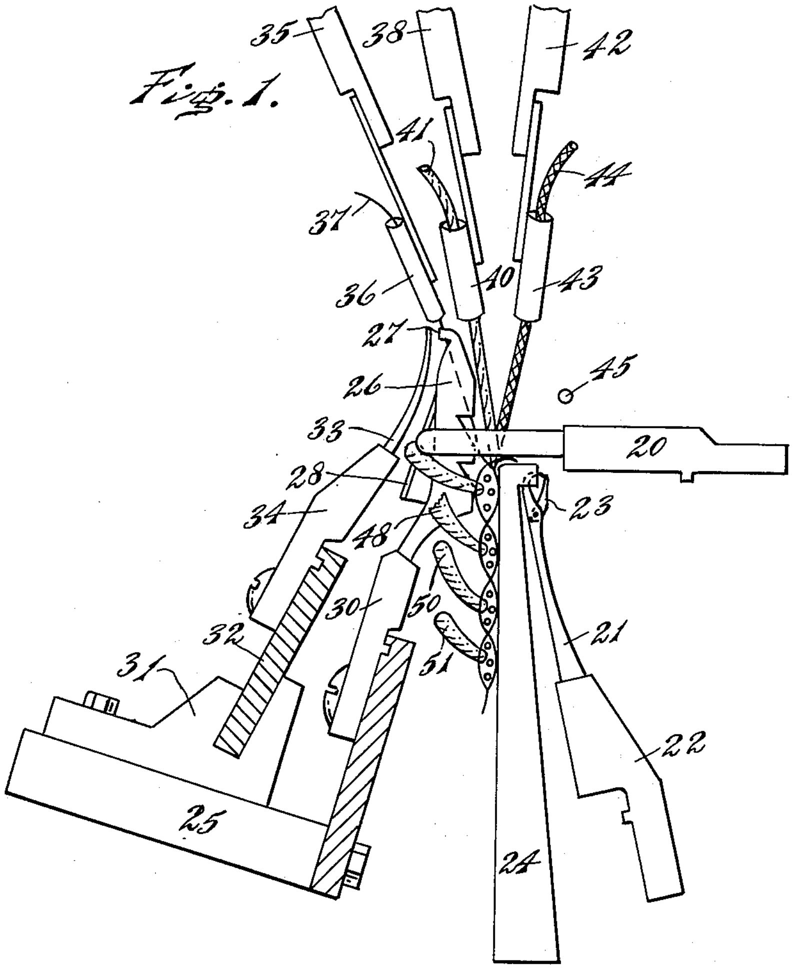

FIGURE 1 shows the relation of the parts at 40° in the cycle. The cam cycle followed will conveniently conform to my U.S. Patents Nos. 2,949,754 and 2,949,755, although any desired cam cycle can be employed.

As shown in FIGURE 1, a sinker comb 20 has advanced across the gang of needles 21 which are mounted on a needle support 22 and which have pivoted latches 23 as well known. The needles are guided in notches on one side of trick plate 24. On the other side of the trick plate is a plush point bar 25 which has mounted at its top on the side nearest to the trick plate a set of cutting plush points 26 of the character described in my U.S. Patents Nos. 2,891,396, 2,907,193 and 2,907,191. The cutting plush points have at the side remote from the trick plate hook ends 27 and below the hook ends on the same side diverging from the trick plate are cutting blades 28. There is one cutting plush point 26 at each needle space clear across the machine.

The cutting plush points 26 are suitably mounted on cast bases 30 as well known. The plush point bar 25 mounts auxiliary guides 31 which support in shoggable position an auxiliary plush point bar 32 on which are positioned at selected lateral positions, which can coincide with selected needle spaces, shields 33 which are suitably cast in groups on bases 34 bolted to the auxiliary plush point bar 32. Above the needles and the plush points is mounted a swing bar bracket as well known, on which are mounted in shoggable relation a knitting yarn guide bar 35 having eyes 36 and threading knitting yarn 37, a pile yarn guide bar 38 having eyes 40 threading pile yarn 41, and a backing yarn guide bar 42 having eyes 43 threading backing yarn 44, all as well known. It is not critical in the present invention whether more than one or only one guide bar of pile yarn is used, and one pile yarn guide bar is shown for the sake of simplicity. A latch wire 45 is shown to engage the needle latches as well known.

The action of the cutting plush point is described in my U.S. Patents Nos. 2,891,396, 2,907,191 and 2,907,193, and it will be understood that this action is modified in the case of the present invention by the action of the shield.

Figure 1A:
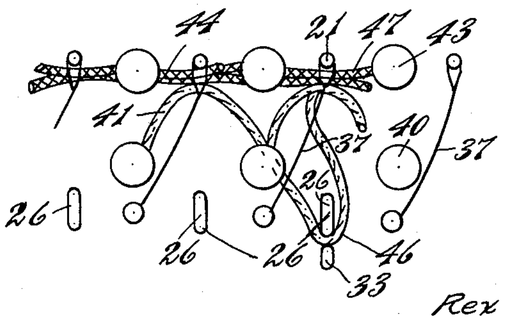

In FIGURE 1*a* the needles 21 are shown engaging pile yarn 41 and backing yarn 44 in the previous stitch. The plush points 26 are raised and at certain positions as shown, only the cutting plush points 26 are present, but at one position a shield 33 is also present. A previous loop 46 has formed around the cutting plush point 26, at a time when the shielding plush point 33 was not present due to the fact that it had been shogged to a different lateral position.

It will be evident that the frequency of location of the shield 33 will be a matter of initial determination, or of selection, since shields may be present in alternate needle space positions or every third needle space position or in groups with spaces as desired. In an embodiment later explained, the shields are present at all needle space positions but are made inoperative by removing them from the path of the yarn.

In FIGURES 1 and 1*a*, the backing yarn guide bar 42 with its guide tubes 43 and backing yarn 44 is shogged weftwise to form the inlay 47 of backing yarn for the next stitch. Pile yarn guide bar 38 with its guide tubes 40 and yarn 41 may shog if desired at this point according to the requirements of the stitch and pattern. It will be evident that the loop 46 from the last stitch will not be cut until a succeeding stitch, when it moves down the blade 28 far enough to develop sufficient tension for cutting. A previous loop has formed cut tufts 48 in FIGURE 1, and two previous uncut loops 50 and 51 are shown.

Figure 2:
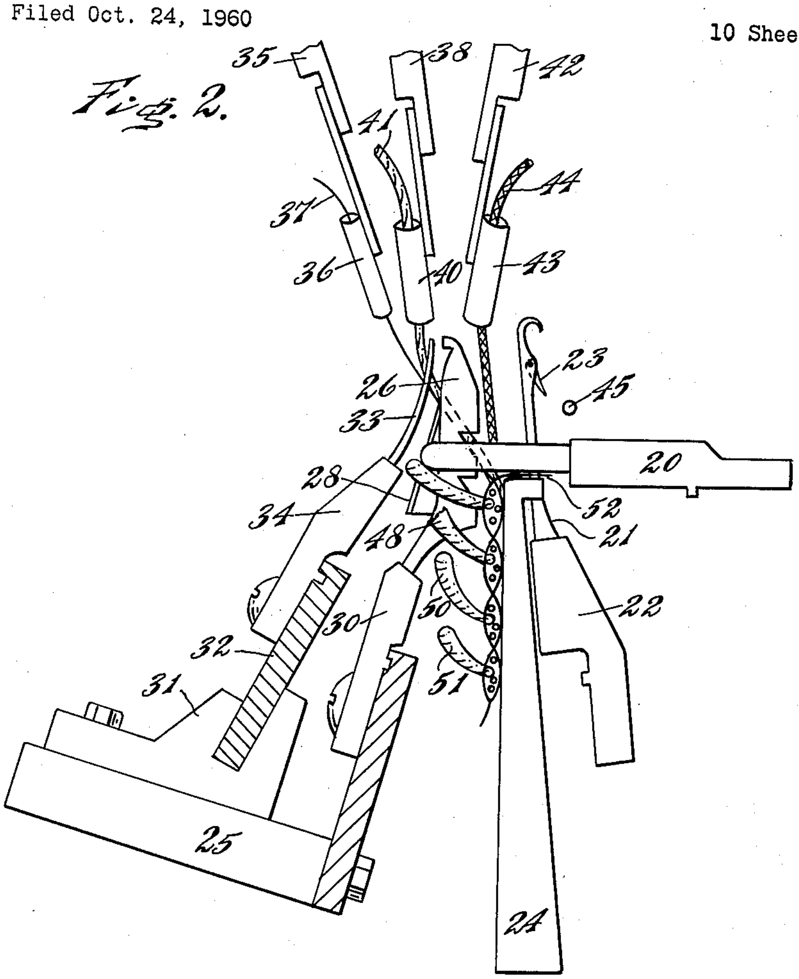
Figure 2A:
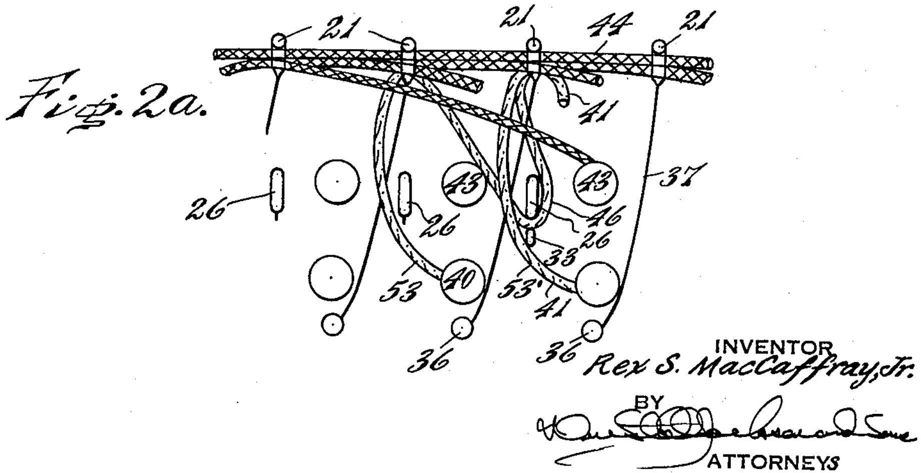

Referring to FIGURES 2 and 2*a* at 110° in the cycle, the guide bars 35, 38 and 42 have swung to the plush point side of the machine, and the needles 21 have advanced upward with the knitting yarn loop 52 from the last stitch sliding down on the shanks of the needles and opening the latches 23 which have been prevented from closing by the latch wire 45. Pile yarn guide bar 38 with its guide tubes 40 and pile yarn 41 have completed the shogging motion in order to form the loops 53 of pile yarn around cutting plush points 26 and the loops 53' around plush points which are shielded by shields 33. This is best seen in FIGURE 2*a*.

Figure 3:
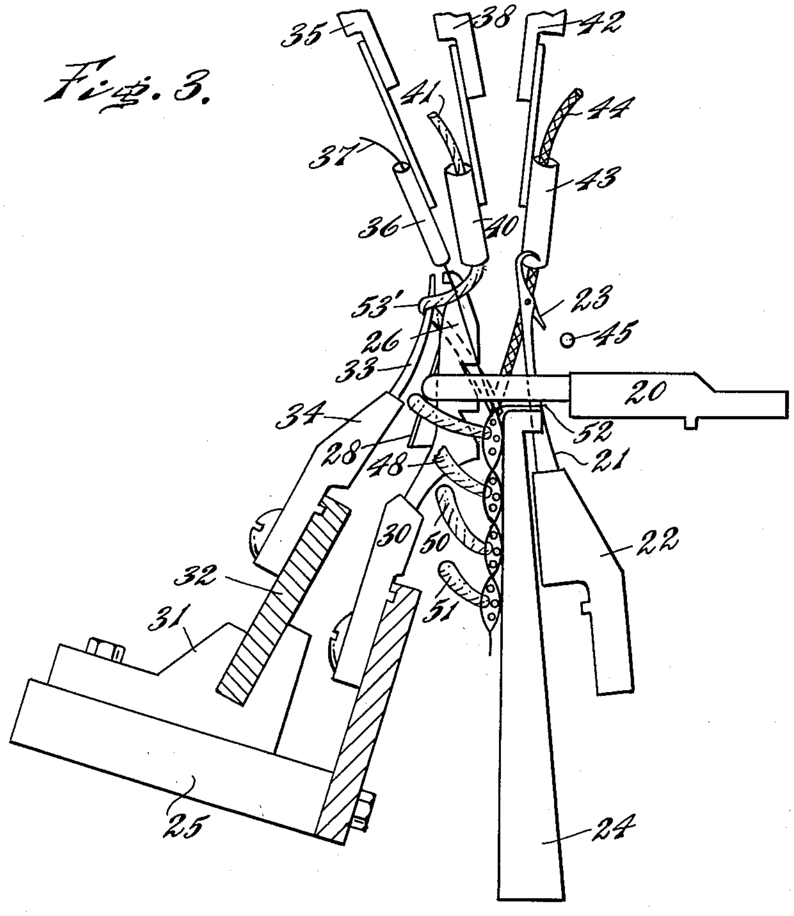
Figure 3A:
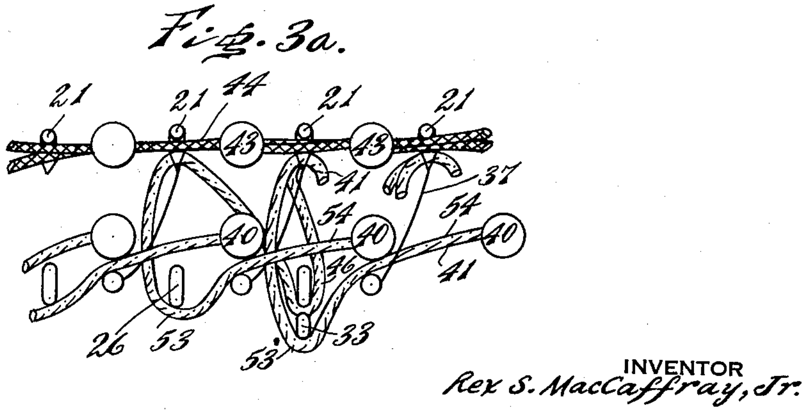

FIGURES 3 and 3*a* at 210° in the cycle show the guide bars 35, 38 and 42 which have swung back to the midpoint, the pile yarn guide bar 38 and its guide tubes 40 having shogged as shown in FIGURE 3*a* to complete the loops 53 around cutting plush points 26 and the loops 53' around shields 33, and also to make inlays 54 in front of the next needles 21 in order to form the second leg of the loop. This in effect causes the loop to span from one chain of knitted crochet stitches to the next, as well known in the art.

Figure 4:
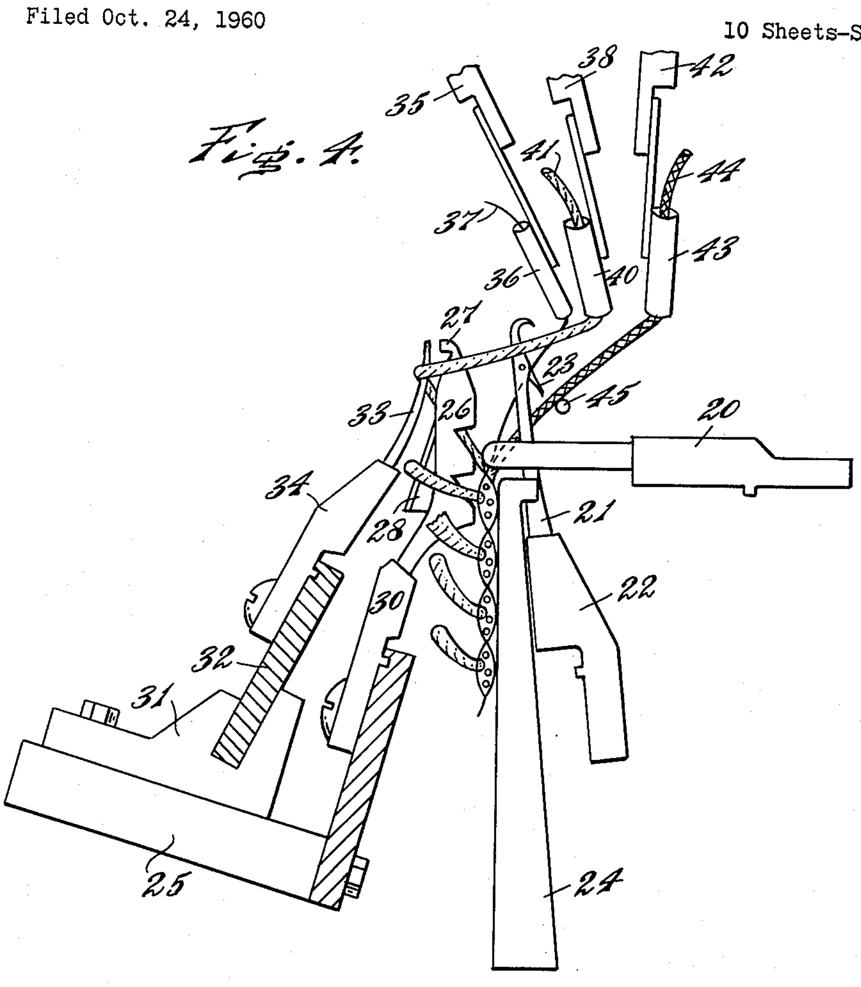
Figure 4A:
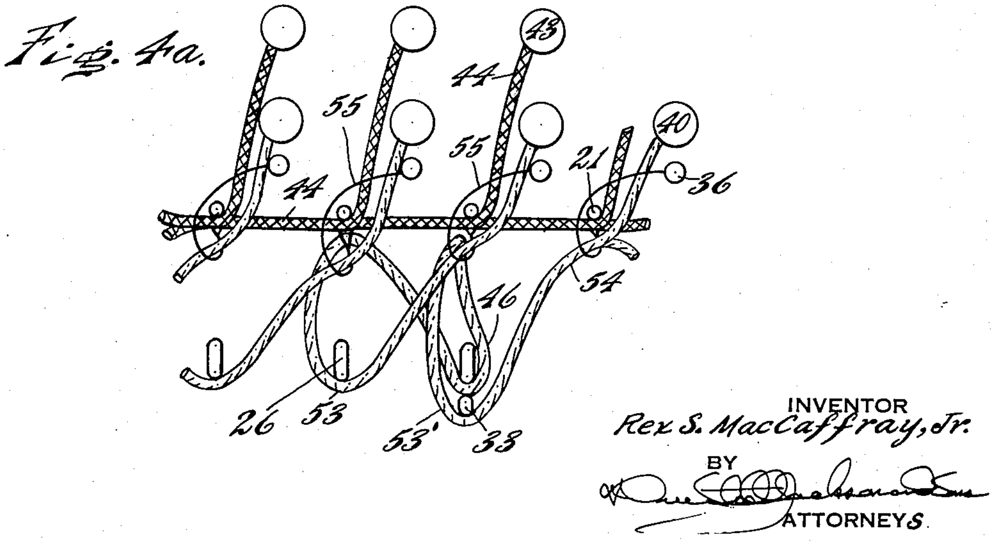

In FIGURES 4 and 4*a* at 270° in the cycle, the guide bars 35, 38 and 42 have swung toward the needle side and in position for knitting yarn guide bar 35 to shog weftwise and moves its guide tubes 36 one needle space in order to form a loop 55 of knitting yarn which enters the hooks of the latch needles 21. This is best seen in FIGURE 4*a*.

Figure 5:
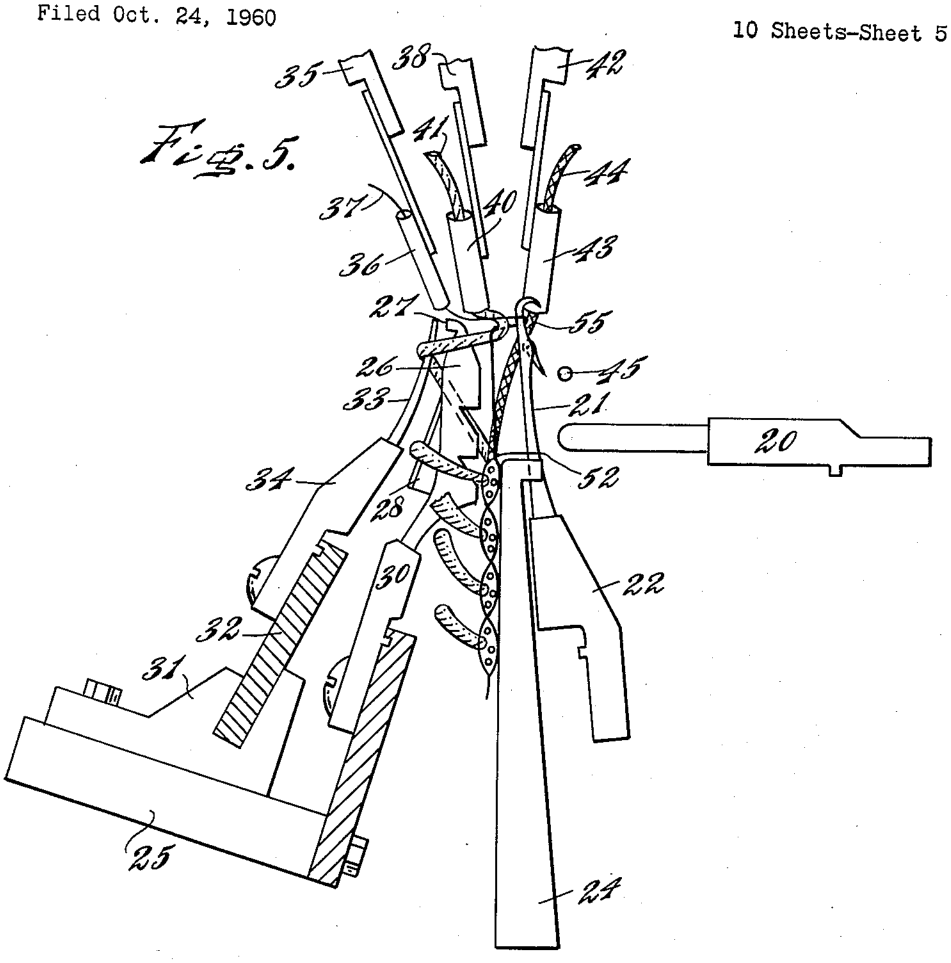
Figure 5A:
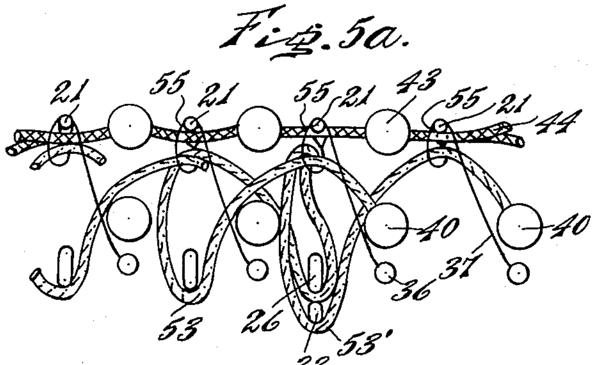

In FIGURES 5 and 5*a* at 300° in the cycle, the guide bars 35, 38 and 42 swing back almost to the midpoint, needles 21 and plush points 26 including the shields 33 are ready to start to retract downward, and sinker comb 20 has moved back away from the path of the new stitch. Knitting yarn 37 appears in the hooks of the needles uniting together the backing and pile yarn and anchoring the legs of the new loops 53 around the cutting plush points and the new loops 53' around the shields. Backing yarn 44 and its guide tubes 43 are not shown in front of the needle for clarity.

Figure 6:
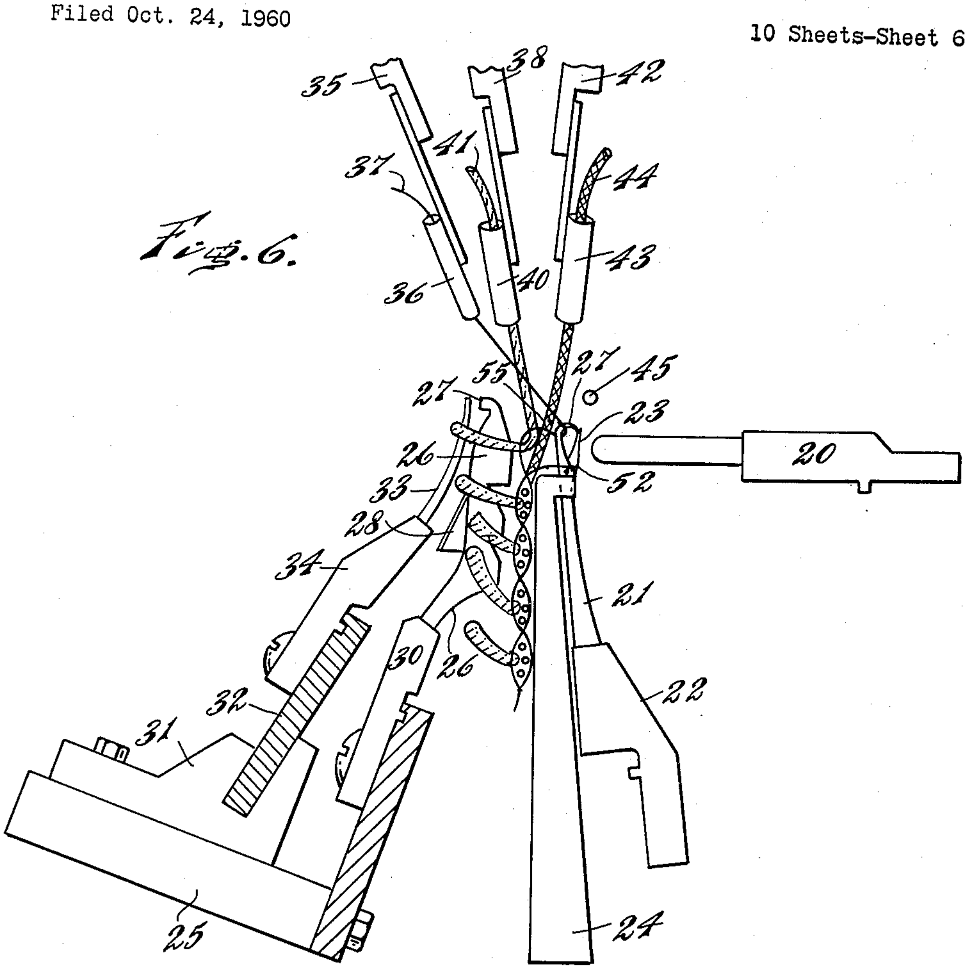
Figure 6A:
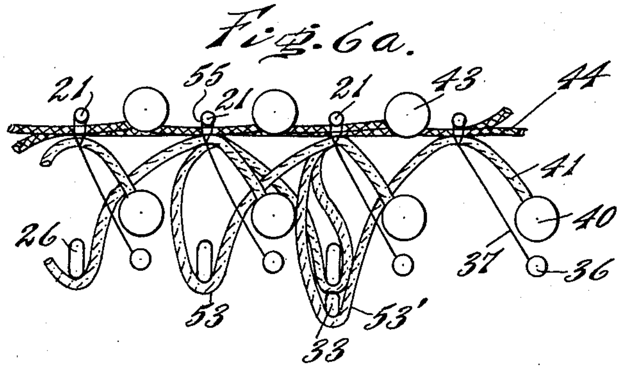

In FIGURES 6 and 6*a* at 330° in the cycle, the guide bars 35, 38 and 42 are still at midpoint, and the cutting plush points 26 and the shields 33 as well as the needles 21 have almost fully retracted. The sinker comb 20 has started to re-enter and advance over the stitch. The loop of knitting yarn 52 around the previous stitch is being slid up over the needle 21, closing the latch 23 ready to cast off over the new loop of knitting yarn in the hooks 27 of the needles.

Figure 7:
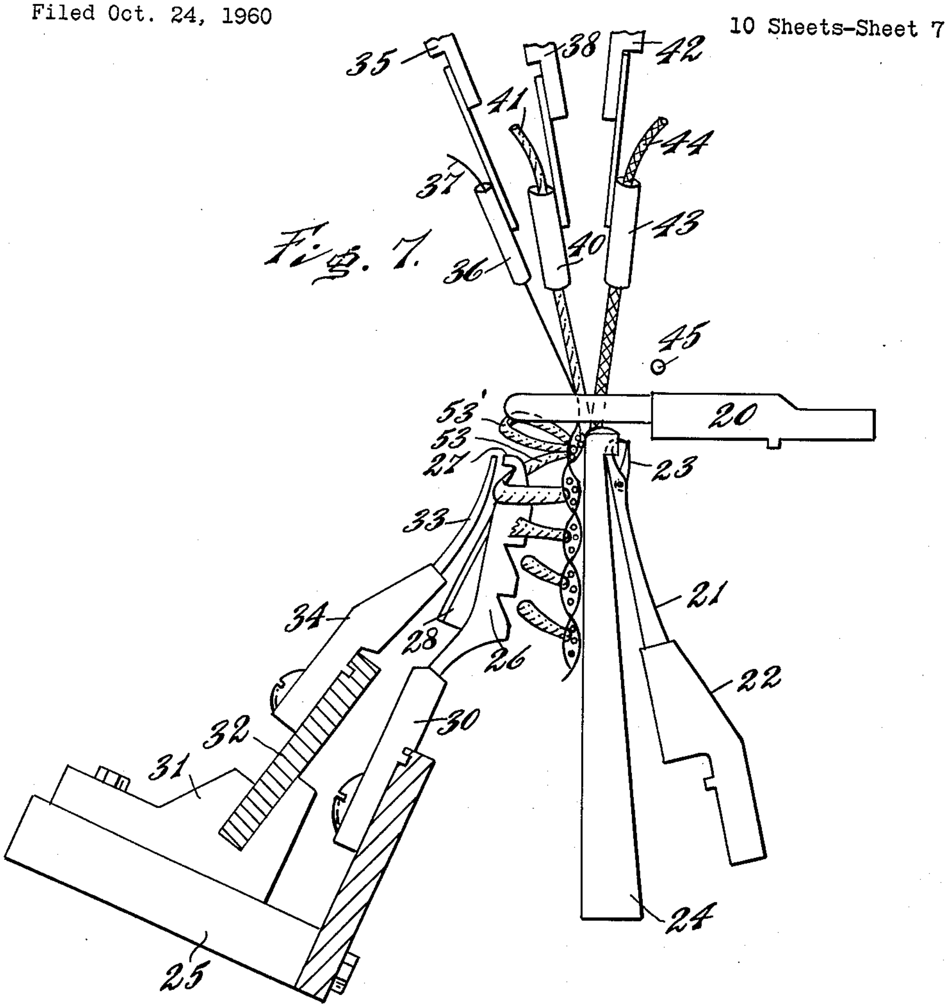
Figure 7A:
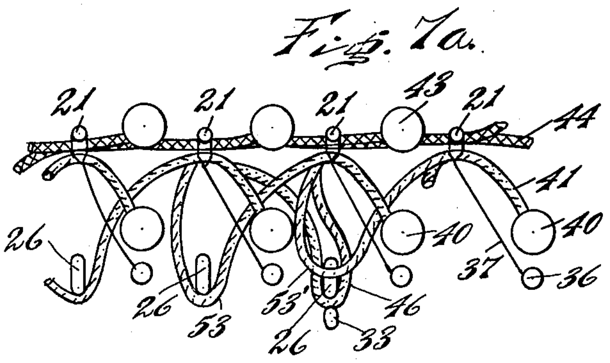

In FIGURES 7 and 7*a* at 360° of the last cycle or 0° of the new cycle, the guide bars 35, 38 and 42 are still at midpoint, the sinker comb 20 has fully advanced across the needles and the trick plate, the cutting plush points 26 and the shields 33 as well as the needles 21 have fully retracted, and new pile yarn loops 53′ which were around the shields have been cast off, and new pile yarn loops 53 around the cutting plush points have been retained and will soon be cut, in a subsequent stitch. The auxiliary loop plush point bar 32 carrying the shields 33 is now free to be moved by the shogging mechanism to any desired new position laterally, for forming pile loops instead of cut pile according to the pattern. This shogging mechanism will be described later in connection with FIGURE 8.

Between FIGURES 7 and 7*a*, on the one hand, and FIGURES 1 and 1*a* at 40° on the next cycle, on the other hand, the plush points are advanced to the top position and loops 53 from a previous stitch on cutting plush points 26 are cut. Backing yarn guide bar 42 with its tubes 43 and backing yarn 44 are shogging to form the inlay for the next cycle.

Figure 8:
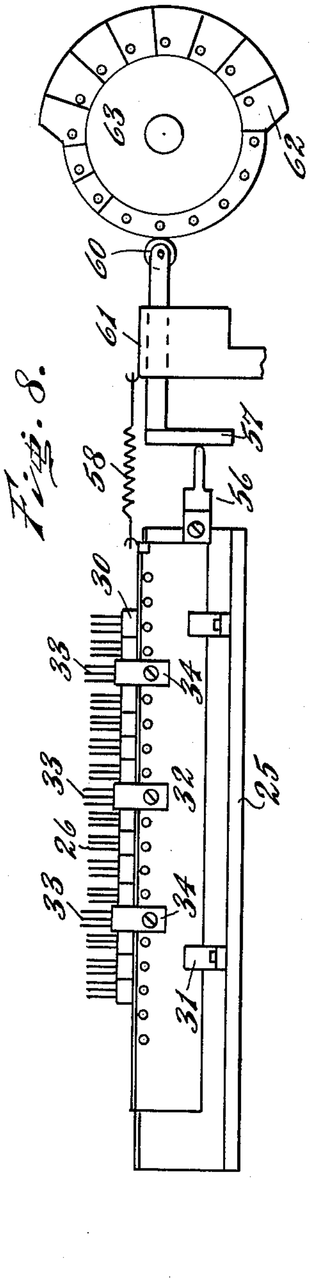
FIGURE 8 is a diagrammatic fragmentary elevation of the knitting machine from the plush point side, showing one device for selection of cut and uncut plush points according to the invention.

In FIGURE 8 the auxiliary plush point bar 32 has a follower 56 which engages a plunger 57 and is spring urged against the plunger by helical tension spring 58. The plunger has a follower roller 60 and is guided in a guide bracket 61. The follower roller follows a pattern chain 62 which is advanced step by step by any suitable pattern chain feed mechanism and is positioned on drum 63, as well known in the art.

In operation of the device of FIGURES 1 to 8, it will be understood that at a suitable point in the cycle, suitably the position of FIGURES 7 and 7*a*, when the plush point bar is retracted and when all loops have been cast off from the shields, the shields shog to a new position in accordance with the dictates of the particular operative link of the pattern chain. Other parts of the operation are as described above.

Figure 9:
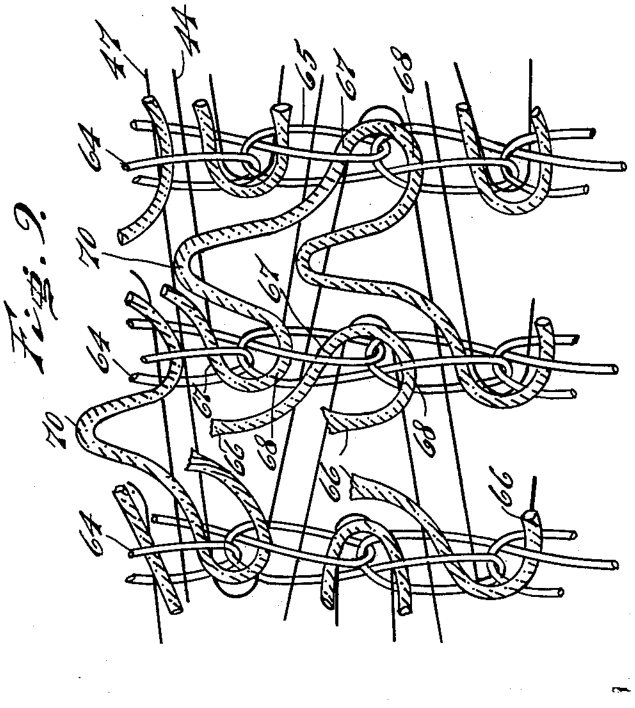
FIGURE 9 is a diagrammatic fragmentary plan view of the face of a warp knitting pile fabric produced according to any one of the methods and mechanisms of the invention.

The resulting fabric as shown in FIGURE 9 comprises a series of chains 64 of crochet stitches 65, which unite together backing yarn 44 which extends across at least three lines of stitches in the form of inlays 47. In certain stitches pile tufts 66 are upstanding where cutting plush points 26 were encountered and these are bound each in two stitches at 67 and 68 as well known in the art. Where, however, shields 33 have been encountered, uncut pile loops 70 appear and these are bound at two points 67 and 68 in each of two adjoining chains, as well known in the art.

It will be evident that the detail of the construction of the particular fabric may be varied widely within the concepts of the present invention, while still employing the principles of selectively utilizing cutting and non-cutting or shielded plush points.

Figure 10:
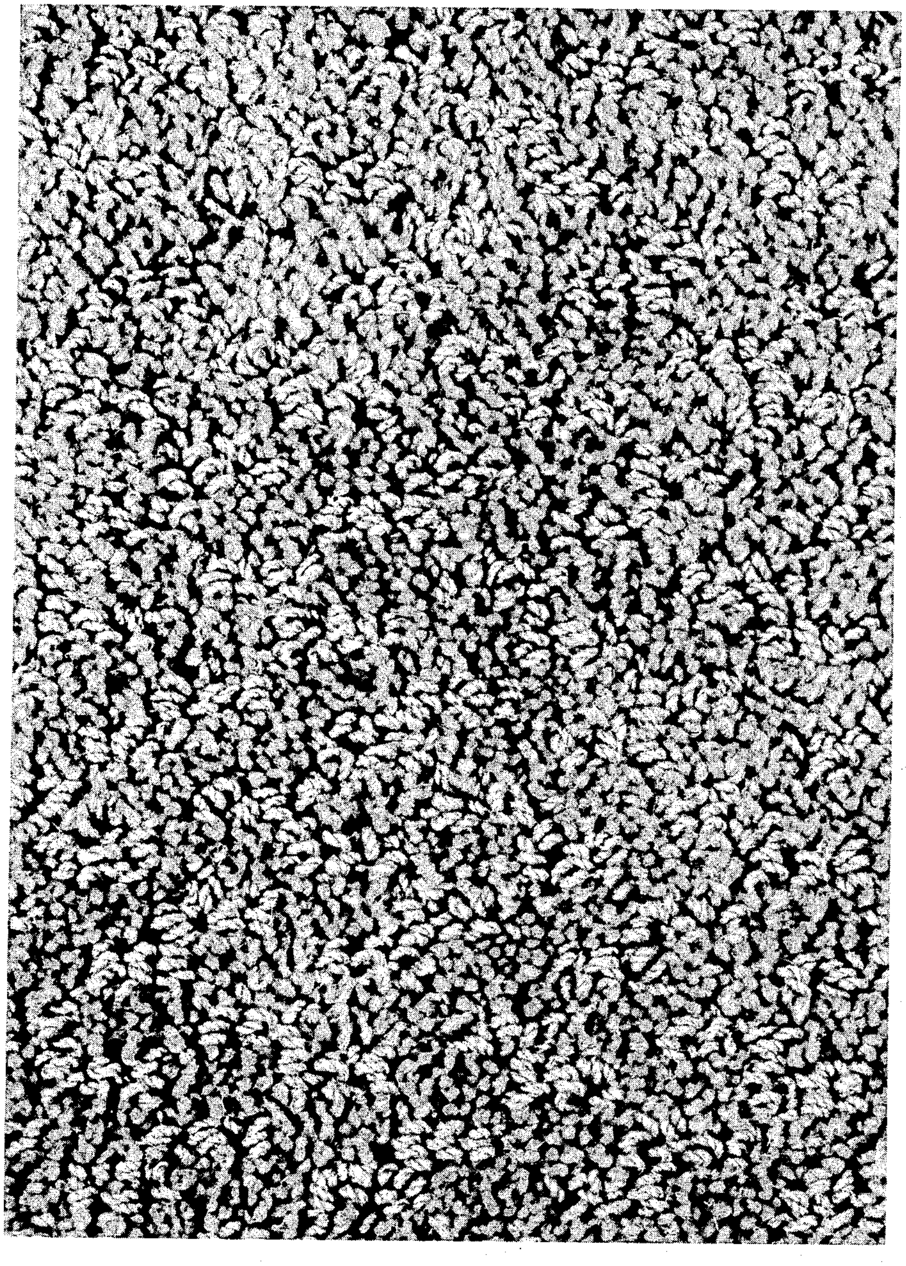
FIGURE 10 is a photographic view of the face of a warp knitted pile fabric according to the present invention.

FIGURE 10 illustrates photographically the face of a fabric according to the invention which shows areas of loop pile and areas of all cut pile tufts. This fabric was produced with a single pile yarn guide bar and using the shoggable plush point shields as described in connection with FIGURES 1 to 8.

In many cases it is preferable to have an infinite variation or selection between cutting and non-cutting plush points, including all cut or all non-cut, without the need for changing an auxiliary or shield plush point bar, as in the form of FIGURES 1 to 8.

Figures 11, 12:
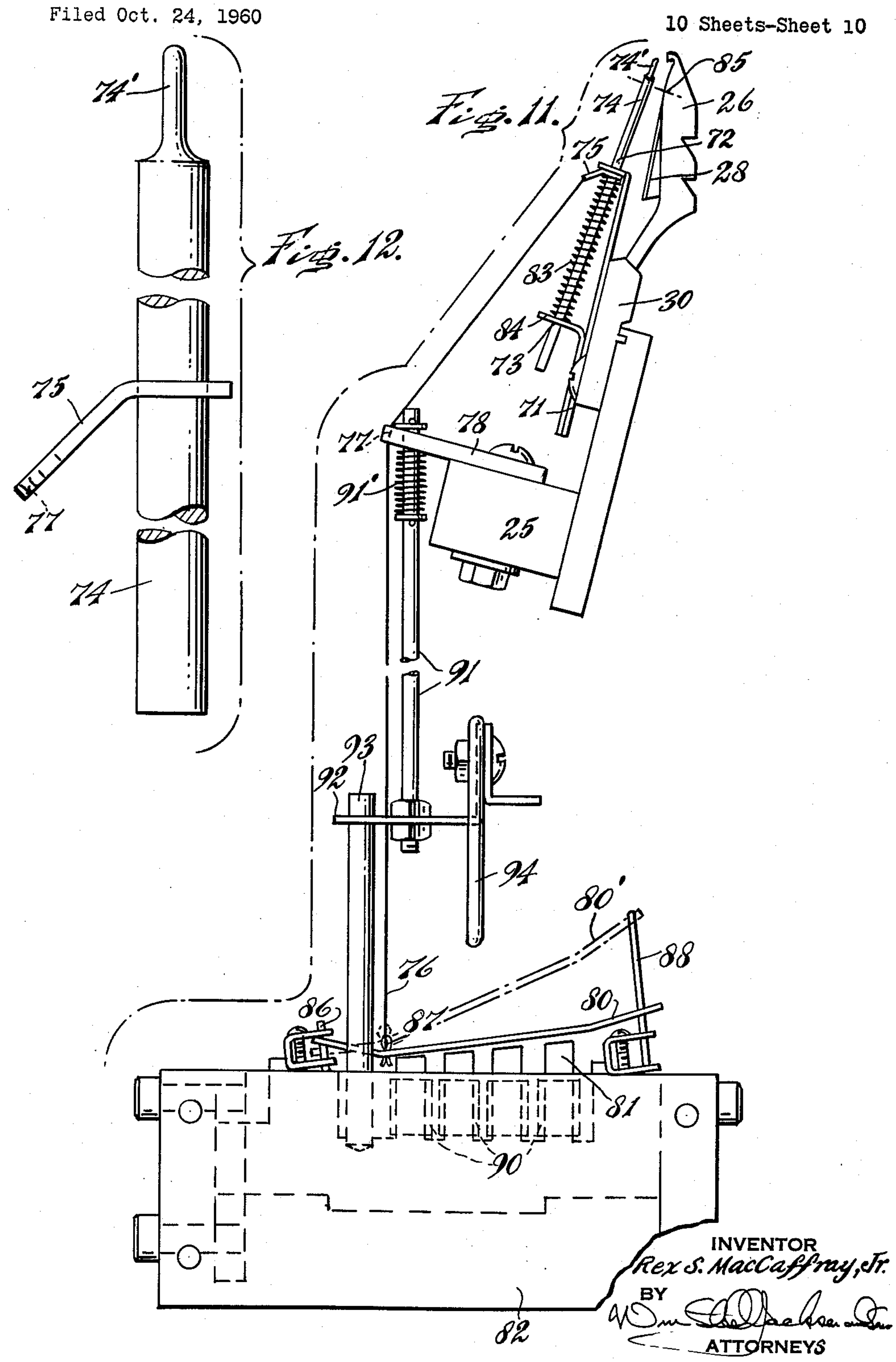
FIGURE 11 is a diagrammatic fragmentary transverse section showing a variation, in which selection is possible to make all cut, all uncut or any combination of cut and uncut fabric without changing the plush points.

This is possible with the preferred embodiment of the invention as shown in FIGURE 11.

An auxiliary bracket 71 is affixed to the plush point bar by the same bolts which secure the castings 30 for the cutting plush points 26. The auxiliary bracket 71 has for each needle position a top guide opening 72 and a bottom guide opening 73 for a shield 74, having a shielding tip 74′, better seen in FIGURE 12. The shield 74 has secured thereto an anchorage 75, which connects to a cord 76 guided by eye 77 on guide 78, and the cord connects to one of the armatures 80 of a magnetic member 81 which is individual to each shield and is suitably mounted on the bed of the machine at 82. The attachment 75 also acts as a spring abutment, there being a helical compression spring 83 surrounding the shield and acting against the bracket portion 84 to urge the shield into forward position.

A suitable electrical selector, conveniently a pattern drum, which may be of the character shown in my U.S. Patent No. 2,932,181, or any other suitable pattern drum as well known in the art, selectively energizes magnetic devices at the positions of FIGURES 7 and 7*a* and retains them energized during the remainder of the cycle, releasing them at a change in the pattern which corresponds with FIGURES 7 and 7*a* of the next cycle.

The pattern control as shown in FIGURE 12*a* is accomplished by an electrical contact pattern switch drum 95, suitably of a conducting metal like copper or steel, which is keyed on a suitable shaft 96 mounted on suitable bearings, not shown. The shaft is conveniently driven as by chain and sprocket drive 97 in step with the knitting machine. The drum 95 has a spring electric contact finger 98 which is suitably grounded, as shown. The drum has a plurality of parallel contact paths or channels 100, only a few of which are shown, and which consists of electric contact making areas 101 and electrically insulated areas 102 conveniently made by attaching insulating tape to the drum. Each contact path is engaged by an electric contact finger 103 which is connected to an electric circuit 104 which is connected through the magnet coils 90 for a particular armature 80, the opposite side of said magnet coils passing through the power source (not shown) to ground. As the plush point bar 25 moves up, the cords 76 pull on the shields 74 whose magnetic devices are energized, thus retracting those shields to the level of the line 85 in FIGURE 11.

While any suitable pattern control device may be employed, including a Jacquard, it is very convenient to use a mechanism of the character shown at the bottom of FIGURE 11 which has magnetically susceptible armatures 80, one for each needle space, pivoted at 86 and provided with a ring 87 for engaging the cord 76. The armature is guided during its stroke by a pin 88 extending into a suitable slot in the end of the armature.

Each armature is forcibly placed in contact with the poles 81 of a group of the magnet coils 90 (which may be actuated simultaneously in series or in parallel as desired) on each cycle, and if the magnet coils are energized the armature is held down which serves to tension the cord 76 and to retract the shield 74 to the position of lines 85 when the plush point bar is raised. On the other hand, if the coils 90 are not energized, the armature 80 is raised by spring 83 acting on cord 76, to the position shown by dot-and-dash lines at 80′, and then the shield 74 is not retracted and an uncut loop is formed at that particular needle space.

The periodic lowering of all of the armatures 80 to bring them into position closely adjacent the poles 81 of the coils 90 is accomplished prior to each selection by push rods 91 connected at the top at 91′ by a spring connection to the plush point bar 78 and guided at the bottom by bracket portion 92 on pins 93 which are secured to the mounting 82 of the coils. The bracket 92 carries a suitable transverse cushion pusher 94 which engages all of the armatures 80 as the push rods 91 move down, to bring the armatures so close to the poles 81 of the coils 90 that very little electrical energy is required to hold those armatures down which are to remain retracted. Accordingly, it is possible to operate the selector mechanism with relatively very low current consumption, and thus greatly simplify the construction and reduce the size of the wiring required.

In view of my invention and disclosure, variations and modifications to meet individual whim or particular need will doubtless become evident to others skilled in the art, to obtain all or part of the benefits of my invention without copying the mechanism and method shown, and I, therefore, claim all such insofar as they fall within the reasonable spirit and scope of my claims.

Having thus described my invention what I claim as new and desire to secure by Letters Patent is:

1. The method of Raschel warp knitting of a fabric on a knitting machine having a trick plate, united needles on one side of the trick plate having an advanced position and a retracted position of the needles, cutting plush points one at each needle space on the other side of the trick plate having an advanced position and a retracted position of the plush points, shields on the sides of the cutting plush points located remote from the trick plate which are independently manipulated to shield certain cutting plush points and thus form non-cutting plush points at certain needle spaces differing selectively on each stitch, in which previous pile loops are formed over the plush points and previously produced fabric extends downward between the plush points and the trick plate, and having a pile yarn guide bar, a backing yarn guide bar and a knitting yarn guide bar which swing together between the needle side and the plush point side and vice versa and which shog independently in the direction of the line of needles, which comprises manipulating the shields for the particular stitch to make certain selected plush points act as cutting plush points and certain other selected plush points act as shielded non-cutting plush points according to a predetermined pattern, advancing the plush points, advancing the needles, swinging and shogging the pile yarn around both the cutting and the non-cutting plush points and thereby forming new pile loops which in some cases will be cut in a subsequent course and in some cases will remain uncut after the plush points are retracted, laying in backing yarn, forming chains of knitted crochet stitches in which the legs of the loops of the pile yarn and the laid-in backing yarn will be bound together to form the fabric, retracting the needles and casting off the last formed knitted stitch, retracting the plush points and releasing face pile loops which are around shielded cutting plush points while retaining on the unshielded cutting plush points the face pile loops which are around the unshielded cutting plush points, and relatively moving the fabric and the cutting plush points and thereby cutting said loops on the unshielded cutting plush points to form cut pile in a subsequent course.

2. The method of claim 1, which comprises manipulating shields selectively at each needle space to make any one of the plush points to be a cutting plush point or to be a shielded non-cutting plush point on the immediately following stitch.

3. The method of claim 1, which comprises shogging shields laterally to coincide with individual cutting plush points in the manipulation and thereby to shield such cutting plush points and make them non-cutting.

4. A Raschel warp knitting machine, having a trick plate, a group of united needles on one side of the trick plate which are capable of advancing and retracting, yarn guide bars which are capable of swinging and also shogging, a sinker comb having an advanced and a retracted position above the trick plate, and cutting plush points located on the side of the trick plate remote from the needles, the cutting plush points having an advanced position and a retracted position, in combination with shields selectively movable to positions shielding certain cutting plush points on the side of said cutting plush points remote from the needles and said shields thereby each casting off the pile loop and preventing cutting, said shields also being capable of moving to a position in which particular plush points are left unshielded, and means for selectively positioning the shields to shield certain cutting plush points while leaving other cutting plush points unshielded.

5. A warp knitting machine of claim 4, in which a retractable shield is located at each cutting plush point position.

6. A warp knitting machine of claim 5, having means at each cutting plush point position for selectively retracting the shield so that the cutting plush point is exposed, or advancing the shield so that the cutting plush point is shielded.

7. A warp knitting machine of claim 6, in which the means for selectively positioning the shields comprises a magnetic coil operatively connected to each shield, and means for selectively actuating each said magnetic coil.

8. A warp knitting machine of claim 4, in which the means for selectively positioning the shields comprises armature means operatively connected to each shield, magnetic coil means operatively connected to each armature means, means for moving all of the armature means in unison to a position adjacent to the magnetic coil means, and means for deflecting those armature means which are released by the coil means and thereby controlling certain of the plush point shields.

9. A warp knitting machine of claim 4, in which shields correspond to only some of the cutting plush points and in which the means for selectively positioning the shields comprises means for selectively shogging the shields transversely until they coincide with selected cutting plush points while the remainder of the plush points remain unshielded.

10. A warp knitting machine of claim 9, in which the shields are spaced according to a transverse sequence pattern repeat.

11. The method of claim 1, which comprises casting off the last formed pile loop into the space between the plush points.

12. The method of warp knitting a pile fabric on a Raschel warp knitting machine of the double needle bar type, having one needle bar equipped with a united gang of knitting needles and the other needle bar equipped with a united gang of cutting type plush points in gage alignment with the said knitting needles, there being a selectively movable shield on each cutting plush point which in one posiiton of said shield allows said plush point to hold and subsequently cut face pile loops to form cut pile, and in a second position of said shield protects said cutting plush point from contact with a face pile loop formed around said plush point, which comprises manipulating the shields of the plush points according to a predetermined pattern control so that some cutting plush points are shielded and some cutting plush points are unshielded, forming pile loops around the shielded and unshielded plush points, laying in backing yarn, knitting continuous parallel lines of chain stitches which bind the backing yarn and the legs of the pile loops, at the completion of each course casting off the pile loops which are around the shielded plush points so that they pass between the plush points as subsequent stitches are formed, and retaining the pile loops around the unshielded plush points on the plush points until a subsequent course and there cutting said loops around the unshielded plush points by the cutting action of said unshielded plush points.

13. The method of warp knitting a pile fabric on a Raschel warp knitting machine of the double needle bar type, which has one needle bar of the machine equipped with a united gang of knitting needles, and the other needle bar equipped with a united gang of cutting type plush points in gage alignment with said needles, each said cutting plush point having an independent selectively movable shield controlled from a pattern control device, which said shield in one position permits said plush point to act as a cutting plush point, and which said shield in another position shields said cutting plush point so that it acts as a loop-forming plush point, which comprises moving said shields selectively so that some plush points are shielded and other plush points are not shielded, wrapping pile yarn around the shielded and unshielded plush points to form face pile loops, laying in backing yarn, and knitting parallel lines of crochet type chain stitches which secure the inlaid backing yarn and which bind the legs of the face pile loops formerly around the plush points, casting off from the plush points loops which are around the shielded plush points at the end of each course while leaving the loops around the unshielded plush points, on a subsequent course manipulating the shields differently so that different plush points are shielded and unshielded respectively and on said subsequent course while repeating the knitting, relatively moving the loops around the plush points which were unshielded in the course first mentioned with respect to their plush points to cut such loops, each plush point forming cut pile in some courses and uncut loops in other courses.

References Cited in the file of this patent

UNITED STATES PATENTS

| | | |
|---|---|---|
| 263,999 | Truitt | Sept. 5, 1882 |
| 2,892,331 | Kelly | June 30, 1959 |

OTHER REFERENCES

Text: "Principles of Knitting," by Max C. Miller, McGraw-Hill Book Co., 1931, pages 208–209.